United States Patent [19]
Kobayashi et al.

[11] Patent Number: 5,986,848
[45] Date of Patent: Nov. 16, 1999

[54] ELECTRONIC APPARATUS AND REMOVABLE CARTRIDGE HAVING INTEGRATED ROTATING HEAD DRUM I/O TERMINAL TO BE ELECTRICALLY CONNECTED TO SAID ELECTRONIC APPARATUS

[75] Inventors: Hiroshi Kobayashi, Tokyo; Akio Fukui, Kanagawa, both of Japan

[73] Assignee: Sony Corporation, Tokyo, Japan

[21] Appl. No.: 08/916,695

[22] Filed: Aug. 22, 1997

[30] Foreign Application Priority Data

Aug. 27, 1996 [JP] Japan ................................. 8-225433

[51] Int. Cl.⁶ .................................................. G11B 5/027
[52] U.S. Cl. ............................................................. 360/85
[58] Field of Search ............................ 360/84–85, 132

[56] References Cited

U.S. PATENT DOCUMENTS

| | | |
|---|---|---|
| 3,510,605 | 5/1970 | Ottens . |
| 3,947,892 | 3/1976 | Saito et al. . |
| 4,359,762 | 11/1982 | Stollorz ................................. 360/133 |
| 4,912,580 | 3/1990 | Hanson ................................. 360/98.01 |
| 5,274,506 | 12/1993 | Hashimoto et al. . |

FOREIGN PATENT DOCUMENTS 0768667  4/1997  European Pat. Off. .

OTHER PUBLICATIONS

Patent Abstracts of Japan, vol. 095, No. 008, Sep. 29, 1995 of JP 07 114784 May 2, 1995.

*Primary Examiner*—A. J. Heinz
*Attorney, Agent, or Firm*—Frommer Lawrence & Haug, LLP.; William S. Frommer

[57] ABSTRACT

A cartridge can be loaded and unloaded in a video camera body (11). A cartridge case (11) of the cartridge has therein a recording/reproduction mechanism unit including a pair of reel bases, tape reels supported by the reel bases, respectively and a rotating head drum (17) around which a magnetic tape (17) is wound for achieving recording and reproduction actions. The cartridge case (30) is provided with an I/O terminal substrate (30) to be electrically connected to the video camera body. The magnetic tape extracted from the tape reel is wound around the rotating head drum, and as a result they are integrated with one another.

5 Claims, 12 Drawing Sheets

ELECTRONIC APPARATUS AND REMOVABLE CARTRIDGE HAVING INTEGRATED ROTATING HEAD DRUM I/O TERMINAL TO BE ELECTRICALLY CONNECTED TO SAID ELECTRONIC APPARATUS

BACKGROUND OF THE INVENTION

1. Field of the Invention

The present invention relates to an electronic apparatus and a detachable cartridge having recording/reproduction mechanism which are preferable for use in a video camera and the like for public welfare purpose, and more particularly to an electronic apparatus and a cartridge in which the mechanical unit can be largely simplified and dimensional accuracy of the recording/reproduction mechanism can be relaxed.

2. Description of the Related Art

Since conventionally such a recording/reproduction apparatus in which a magnetic tape is wound around a rotating head drum in a helical fashion and information is recorded in the magnetic tape by running the magnetic tape together with the rotating head drum rotating at a high speed and the recorded information is reproduced by scanning the information by the rotating head drum has been widely prevailed.

In the aforementioned recording/reproduction apparatus, the magnetic tape can be loaded and unloaded relative to the rotating head drum. Generally, a cassette system in which the magnetic tape is wound around a tape reel is employed. Thus, the recording/reproduction apparatus is compatible with other apparatus so as to obtain a proper signal when information recorded in the magnetic tape is reproduced with a different apparatus of the same format. For this reason, the mechanism unit of the recording/reproduction apparatus requires a high dimensional accuracy, and particularly the tape must be wound accurately around the rotating head drum during running thereof.

To enable the magnetic tape to be loaded and unloaded together with the cassette relative to the rotating head drum, such a mechanism for extracting the magnetic tape from the cassette and winding it around the rotating head drum and further a mechanism for winding up the magnetic tape in the cassette are also required, and in addition a special motor for driving this mechanism unit is required.

By the way, the aforementioned recording/reproduction apparatus has been developed recently at a surprising speed and reduction in the size of components composing the recording/reproduction apparatus has been accelerated every year. Thus, they can be produced at lower cost because of the trend of reduction in size of the recording/reproduction apparatus and changes in material for use. For example, because the rotating head drum and various motors can be produced in smaller size and at cheaper prices, reduction in size of the recording/reproduction apparatus and lower cost thereof can be realized.

SUMMARY OF THE INVENTION

In view of such aspects, it is an object of the present invention to provide a novel recording/reproduction apparatus not requiring a high dimensional accuracy by large scale simplification thereof as well as reduction of the production cost and further an electronic apparatus in which a rotating head drum is not located at a deck side or a cartridge which contains the rotating head drum in the cassette and in which a magnetic tape is wound around the rotating head drum so as to be integral therewith.

To achieve the above-described object, according to the present invention, there is provided an electronic apparatus in which a cartridge having a recording/reproduction mechanism unit can be loaded and unloaded, comprising an accommodating portion for accommodating the cartridge, a connector for electrically connecting an I/O terminal provided in the cartridge to the accommodating portion and a circuit unit for the recording/reproduction mechanism unit.

With such a construction, the electronic apparatus only requires a circuit unit for driving and controlling the recording/reproduction mechanism unit of the cartridge. Thus, the tape loading mechanism unit is not required in the electronic apparatus, thus large scale simplification thereof being achieved.

Because the electronic apparatus is provided with a camera mechanism unit, a function of the video camera can be obtained.

Further, according to the present invention, there is provided a cartridge which can be loaded and unloaded on an electronic apparatus and in which a cartridge case has therein a recording/reproduction mechanism unit including a pair of reel bases, tape reels supported by the reel bases and a rotating head drum around on which a magnetic tape is wound for achieving recording and reproduction actions and further an I/O terminal to be electrically connected to the electronic apparatus, the rotating head drum being so designed that the magnetic tape extracted from the tape reel is wound around the rotating head drum so as to be integral therewith.

With such a construction, a signal recorded on the magnetic tape is reproduced by the same rotating head drum and the magnetic tape runs at the same position relative to the rotating head drum during of recording and reproduction. Accordingly, dimensional accuracy of the rotating head drum itself and an accuracy in inclination of the lead relative to the magnetic head and so on can be relaxed.

Because the reel motor for driving the reel base is built in the cartridge case, integration of the reel base and the tape reel can be achieved.

Also, because the drum motor is integrated with the rotating head drum, the rotating head drum and the drum motor can be constructed in a compact size.

Further, since the recording/reproduction mechanism unit is sealed in the cartridge case, it is possible to prevent corrosion in the recording/reproduction mechanism unit and to avoid a formation of dew on the surface of the rotating head drum.

DESCRIPTION OF THE PREFERRED EMBODIMENT

Hereinafter, a case in which an embodiment of an electronic apparatus and a cartridge having a recording/reproduction mechanism unit according to the present invention are applied to a video camera will be described.

Figure 1:
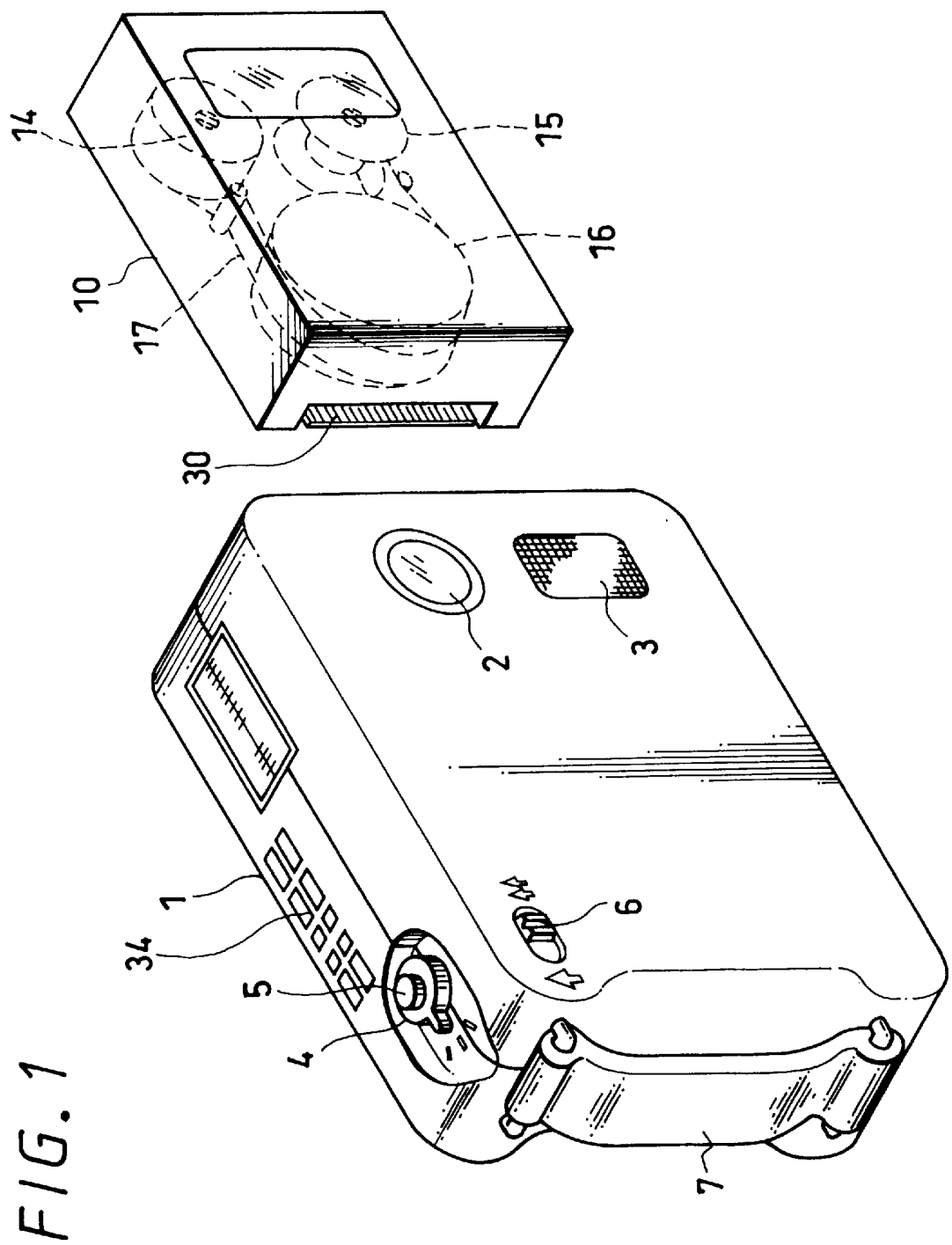
FIG. 1 is a perspective view showing a video camera body and a cartridge having a recording/reproduction mechanism according to the present invention.
Figure 2:
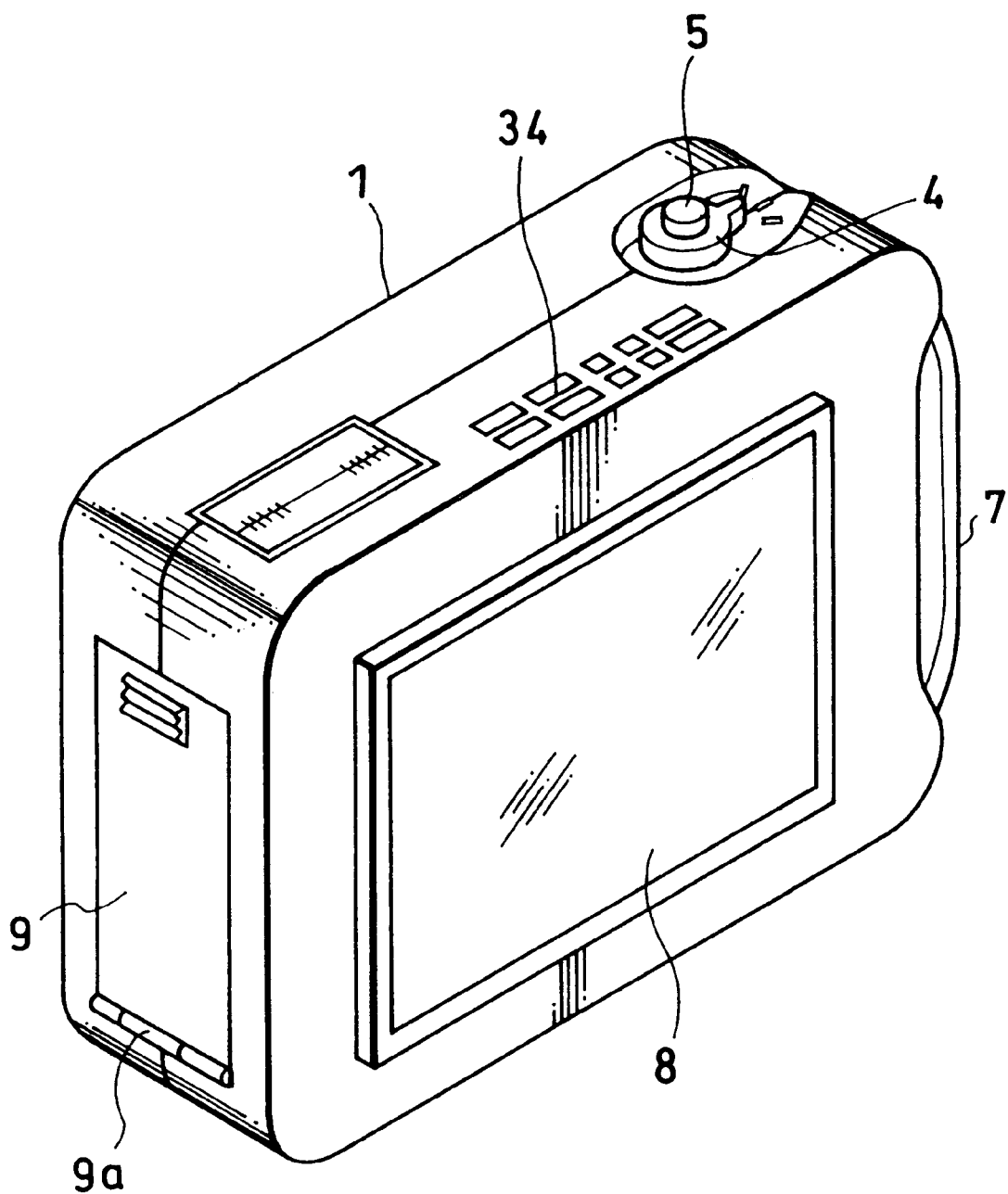
FIG. 2 is a perspective view showing the video camera body viewed from its rear side.
Figure 3:
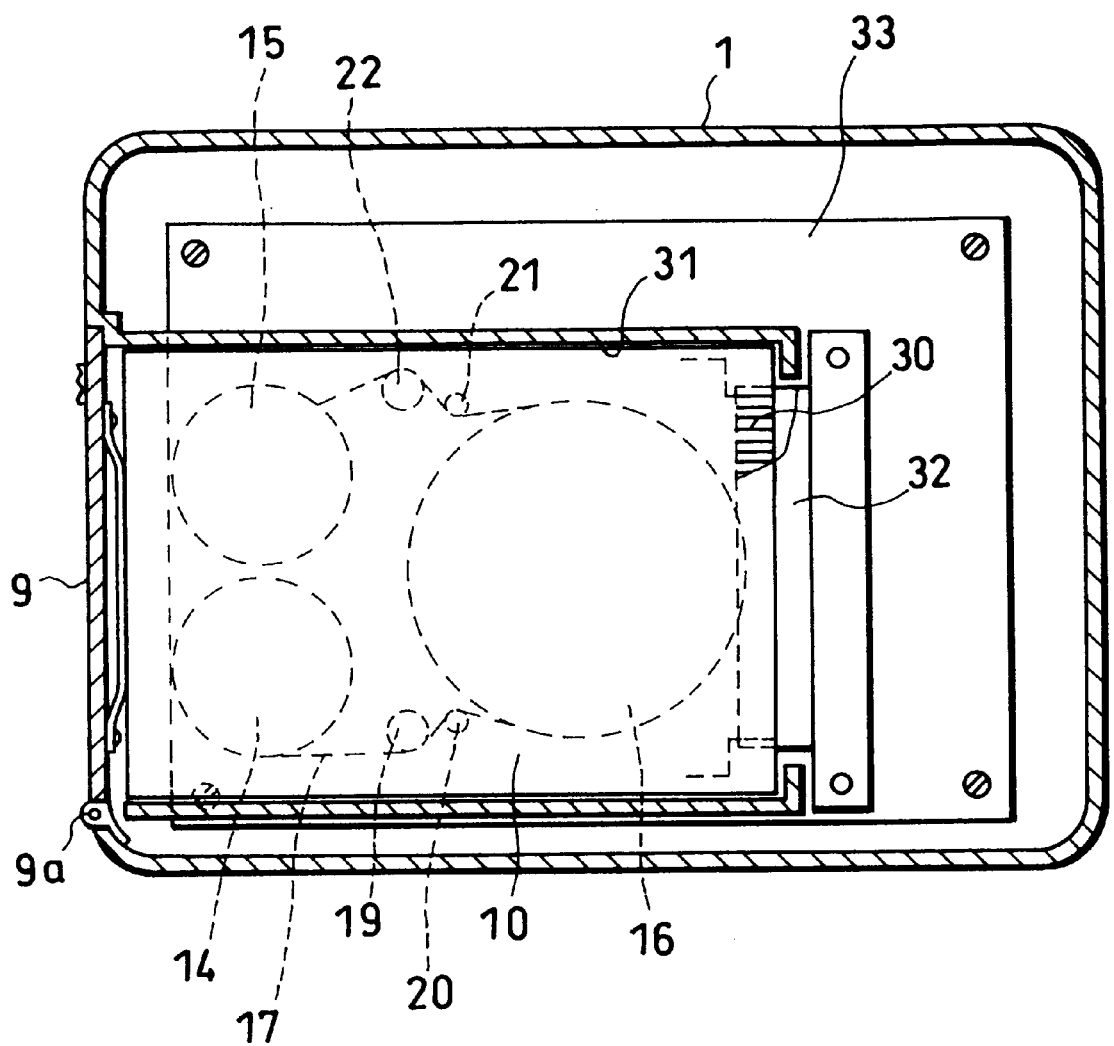
FIG. 3 is a sectional view of the video camera body in which the cartridge is accommodated.

FIG. 1 is an appearance perspective view of a video camera body and a cartridge, FIG. 2 is a perspective view of the video camera body viewed from the rear side thereof, and FIG. 3 is an internal construction diagram of a state in which the cartridge is mounted in the video camera body.

First of all, basic structures of the video camera body and the cartridge will be described.

Reference numeral 1 in the figures generally designates a video camera body. A camera lens 2 of a camera mechanism unit is provided on a front surface of the video camera body 1 and a sound pick-up microphone 3 is disposed below the camera lens 2. On a top surface of the video camera body 1 there is disposed a selection knob 4 for changing over use of the camera and use of the video, and a start/stop button 5 is provided at the center of the knob 4. On the front surface of the this start/stop button 5 is disposed a lens switching knob 6 for changing over the camera lens 2 to a wide angle (tele) and a telescopic (wide). On a side surface of the video camera body 1 at the side of the lens select knob 6 is attached a holder band 7 for holding the video camera body 1 with a user's right hand. On the other hand, a liquid crystal display monitor 8 is provided on a rear side of the video camera body 1.

On a side surface of the video camera body 1 opposite to the holder band 7 is provided a cartridge insertion door 9 which is opened and closed around a hinge 9a, through which a cartridge 10 is accommodated in the video camera body 1.

Figure 4:
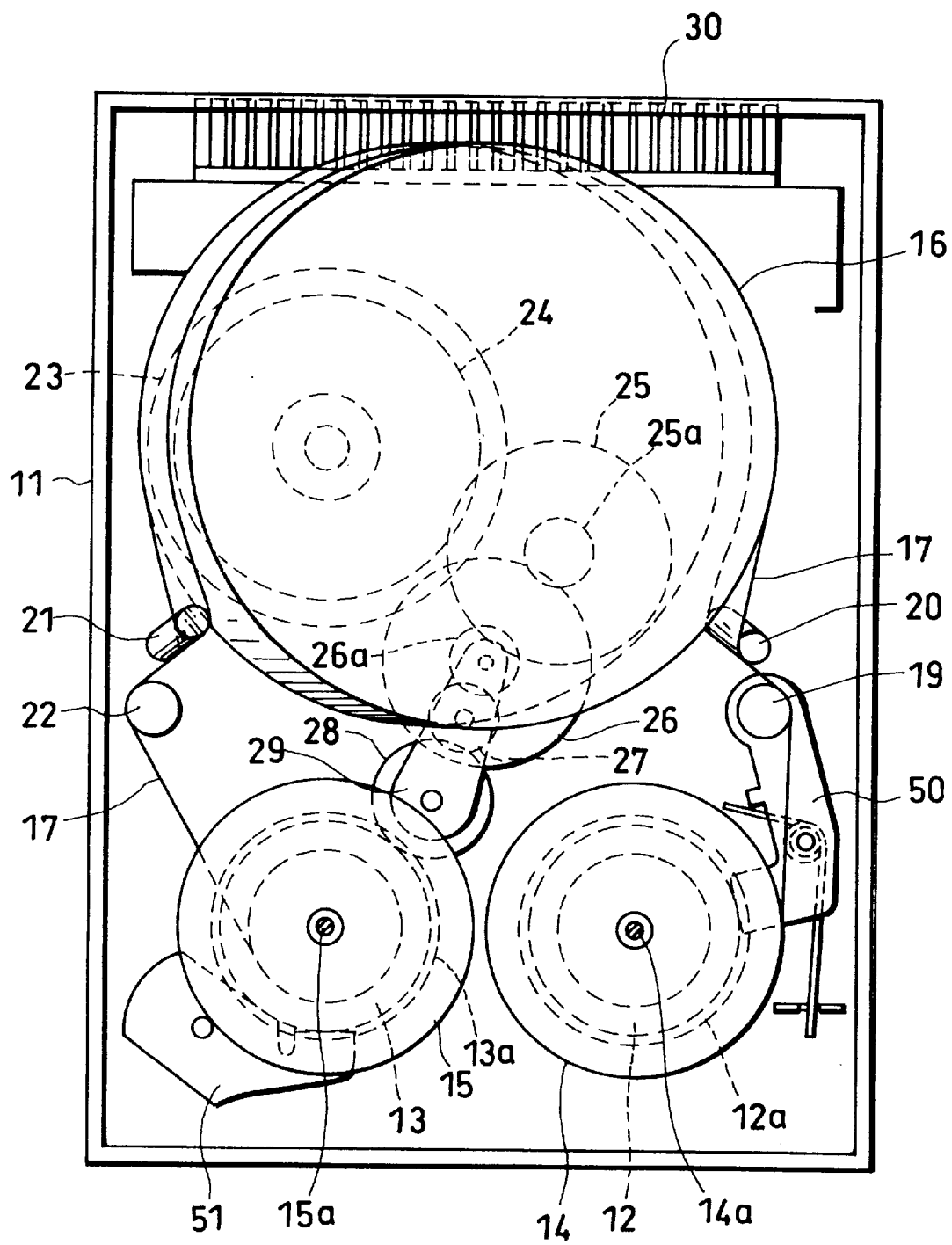
FIG. 4 is a plan view of the recording/reproduction mechanism unit of the cartridge.
Figure 5:
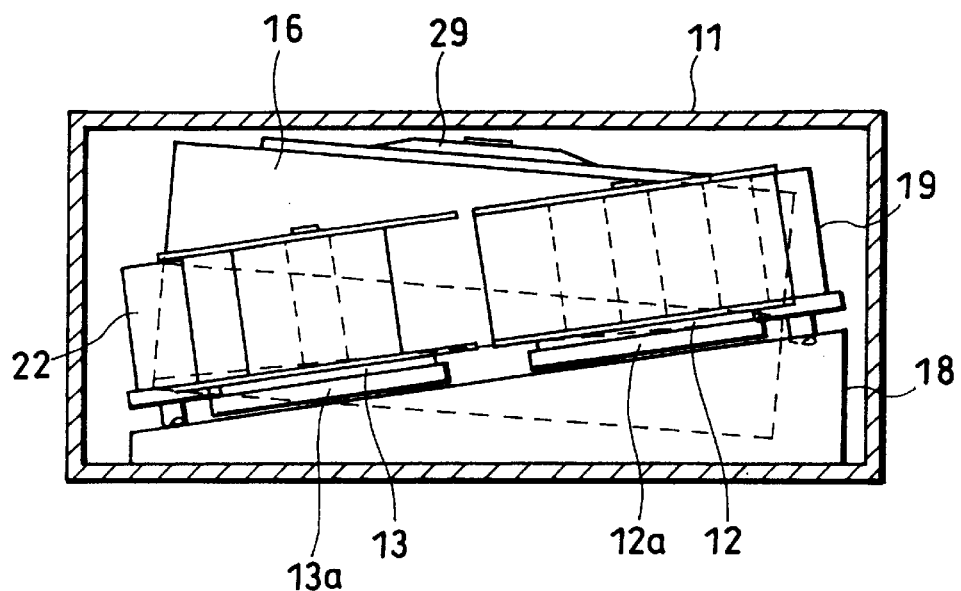
FIG. 5 is a side view showing the recording/reproduction mechanism unit of FIG. 4 viewed from a tape reel side.

Here, the cartridge 10 will be described with reference to FIGS. 4 and 5. A case 11 of the cartridge 10 is molded of a plastic material such that the inside thereof is sealed. The case 11 incorporates therein a pair of reel bases 12, 13 and tape reels 14, 15 which are assembled to the reel bases 12, 13 so as to rotate integrally therewith. Referring to FIG. 4, the right side tape reel 14 is a tape supply side and the left side tape reel 15 is a tape winding side.

In the case 11 there is built in a rotating head drum 16 as well as the tape reels 14, 15. The rotating head drum 16 is slightly tilted toward the tape reel 14 of the tape supply side. A magnetic tape 17 drawn from the tape reel 14 is wound in a helical shape such that it is wound from a top of the drum at drum entrance side and extracted from a bottom of the drum at drum exit side. Then, the magnetic tape 17 is wound around the tape reel 15 on the winding side.

A further detail description will be made. For the magnetic tape 17 to be wound around the rotating head drum 16 smoothly in the helical shape, both the reel bases 12, 13 and the tape reels 14, 15 are mounted on a support base 18 such that they are tilted while the supply side tape reel 14 is located at a higher position. That is, the magnetic tape 17 drawn from the supply side tape reel 14 is adjusted in terms of tape running direction and height direction by a fixed type tape guide 19 and a fixed type inclined guide 20 and then wound on the drum entrance side. Further, the magnetic tape 17 extracted from the drum exit side is adjusted in terms of tape running direction and height direction by means of a fixed type inclined guide 21 and a fixed type tape guide 22 and then wound around the tape reel 15 on the winding side. With such a construction, the magnetic tape 17 is wound around the rotating head drum 16 in that state so that it is not detachable.

On the other hand, the reel bases 12, 13 are so constructed to be driven interchangeably by a reel driving mechanism built in the case 11. Reference numeral 23 designates a reel motor. A driven gear 25 meshes with a motor gear 24. A pendulum fulcrum gear 26 meshes with a small gear 25a of this driven gear 25. A pendulum gear 28 meshes with a small gear 26a of the pendulum fulcrum gear 26 through an intermediate gear 27 such that they are supported by a plate 29. This pendulum gear 28 selectively meshes with the reel base gears 12a, 13a so as to drive the reel bases 12, 13 in a direction of winding the tape. For example, a state shown in FIG. 1 indicates a recording/reproduction state in which the pendulum gear 28 meshes with the reel base gear 13a on the winding side and the magnetic tape 17 is being wound around the tape reel 15 on the winding side.

Thus, driving of the magnetic tape 17 is carried out by the reel motor 23, so that a necessity of a capstan is eliminated.

As the rotating head drum 16, a motor integrated type drum having a drum motor (not shown) is utilized.

Thus, the cartridge 10 of the present invention can be structured in the form of a cartridge containing therein a so-called recording/reproduction mechanism unit, that is, in which the reel bases 12, 13 and the tape reels 14, 15 are incorporated in the case 11 together with the rotating head drum 16. Thus, an I/O terminal substrate 30 for a servo signal for the reel motor 23 and the drum motor, a power signal, a video signal, a voice signal and the like is provided on one side face of the case 11 such that it is exposed out of the case 11.

The above described cartridge 10 is incorporated in an accommodating portion 31 formed in the video camera body 1 as shown in FIG. 3. A connector 32 is disposed on a deep wall side of the accommodating portion 31 so as to protrude into the accommodating portion 31. The connector 32 is fixed to a circuit substrate 33 supported in the video camera body 1. That is, if the cartridge 10 is accommodated in the accommodating portion 31, the I/O terminal substrate 30 is fit to the connector 32 and electrically connected thereto, so that the recording/reproduction mechanism unit of the cartridge 10 is driven and controlled by a control signal from the circuit substrate 33. Meanwhile, operations for recording and reproduction can be performed by operating an operation button group 34 disposed on the video camera body 1 (See FIGS. 1 and 2).

According to the video camera having such a structure described above, the cartridge 10 integrally contains therein the magnetic tape 17 wound around the tape reels 14, 15 and the rotating head drum 16 for carrying out recording and reproduction actions in which the magnetic tape 17 is inseparably wound around the rotating head drum 16. Thus, a signal recorded on the magnetic tape 17 by the rotating head drum 16 is reproduced by the same rotating head drum. Therefore, at the time of reproduction, the rotating head has only to trace the recording track of the magnetic tape. Thus, a position for recording on the magnetic tape does not always need to be in a standardized position (magnetic recording format) relative to the magnetic tape.

That is, because the magnetic tape 17 wound around the rotating head drum 16 runs at the same position relative to the rotating head drum at the times of recording and reproduction, accuracy standard of a tilting angle, relative position and linearity of a lead of the rotating head drum relative to the magnetic head can be relaxed as compared to a conventional tape cassette detachable system.

Further, in a conventional case in which the magnetic tape can be used on a rotating head drum having the same format, if an outer diameter of the rotating head drum changes, the relative speed to the magnetic tape also changes. Thus, it is necessary to standardize the same with a predetermined tolerance. However, in a case in which the magnetic tape 17 is kept wound around the rotating head drum 16 as in the present invention, the relative speed of the rotating head drum 16 to the magnetic tape 17 is not different between recording time and reproduction time. Thus, an influence of the tolerance of the outer diameter of the rotating head drum can be neglected and consequently, it is possible to lighten the accuracy of the outer diameter of the rotating head drum.

Further, because the cartridge 10 is electrically connected to the connector 32 when the cartridge 10 containing therein the recording/reproduction mechanism unit is accommodated in the accommodating portion 31 of the video camera body 1, a mechanism for loading and unloading the cartridge 10 is unneeded and a so-called loading mechanism for winding the magnetic tape around the rotating head drum is not needed at all. Consequently, the number of components composing the mechanism unit of the video camera can be largely reduced, and assembly and adjustment thereof can be facilitated, so that the size of the video camera can be further reduced at cheap price.

Although the cartridge 10 described above shows a basic construction for the mechanism, particular operation can be obtained by providing with the following mechanism. Meanwhile, the same reference numerals are attached to the same components throughout the drawings.

[Reel Constant Revolution Servo Mechanism]

Rotation torques of the tape reel 15 for driving the tape to be wound upon recording and reproduction operations are obtained by the reel motor 23 so as to be rotated at a constant speed. Although the tape speed at the time when the tape winding comes to an end changes more slowly than the tape speed at the time when the tape winding around the tape reel is beginning, because the magnetic tape 17 is integral with the rotating head drum 16 and the same rotating drum head is used for recording and reproduction, recording and reproduction can be carried out without providing the reel motor with any particular servo circuit.

[Sealed Type Cartridge Mechanism]

By making the inside of the cartridge case 11 in a sealed type and keeping the inside dry or in deoxidized state or the like, it is possible to protect respective components of the recording/reproduction mechanism unit from corrosion, particularly preventing the magnetic tape from sticking to the rotating head drum 16 due to formation of dew on the rotating head drum 16.

[Tape Reel Mechanism]

By disposing the tape reels 14, 15 horizontally relative to the case 11, it is possible to eliminate the upper flanges of the tape reels and substitute a top plate of the case 11 for that upper flanges.

[Erasing Head Mechanism]

Figure 6:
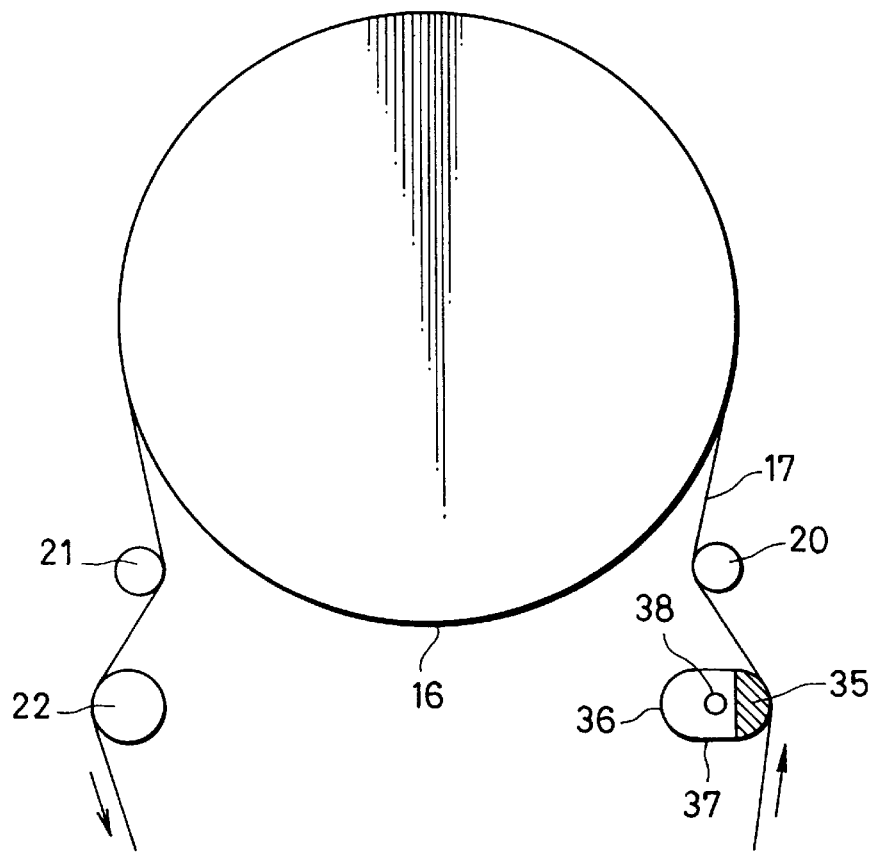
FIG. 6 is an explanatory view of an embodiment of an erasing head mechanism during recording operation.
Figure 7:
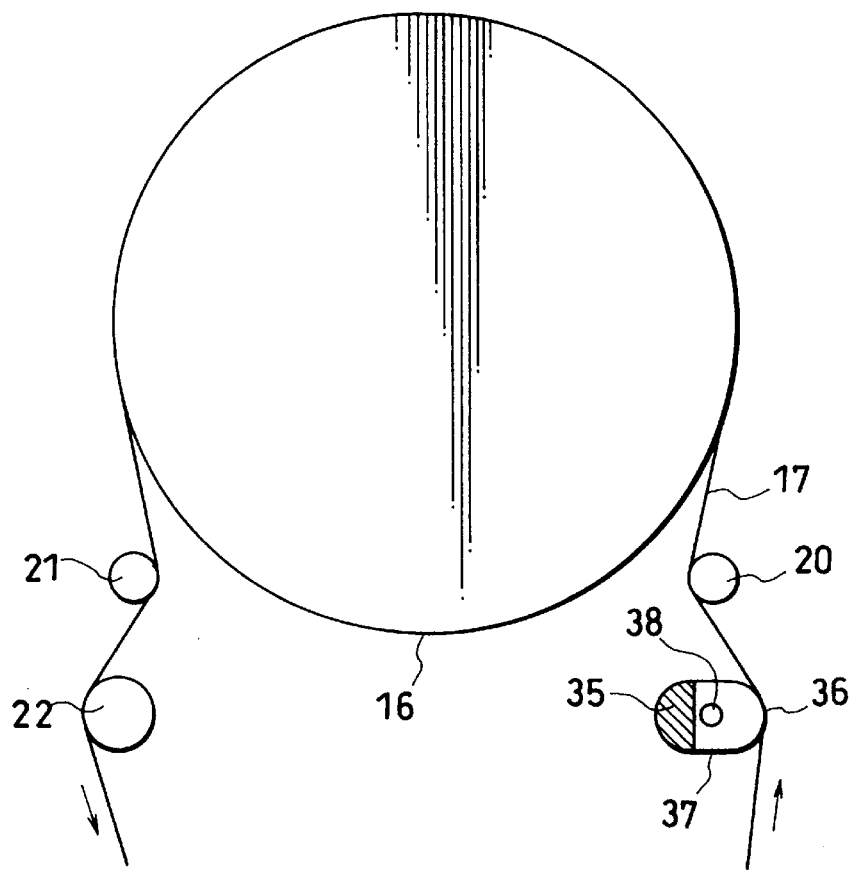
FIG. 7 is an explanatory view of the same during reproduction operation.

As shown in FIGS. 6, 7, a switching member 37 having an erasing head 35 made of a magnet on one side thereof and a guide head 36 on the other side is disposed so as to turn over around a shaft 38 at the entrance side of the rotating head drum 16. At the time of recording, as shown in FIG. 6, the erasing head 35 is turned to the magnetic tape 17 side to erase the magnetic tape before recording action is performed. At the time of reproduction, as shown in FIG. 7, the guide head 36 is turned to the magnetic tape 17 side so as to serve as a guide for the magnetic tape 17. As another example of use of the erasing head, the erasing head can be made to contact the outside of the magnetic tape which is being wound around the tape reel to carry out erasing action.

[Recording of CTL Signal]

A CTL signal is pre-recorded (Pre Rec) on a CTL track of the magnetic tape and then this CTL signal is read by a CTL head to control the reel motor 23 and then to control the tape running. Consequently, the tape running control is enabled without use of a FG (frequency generator) by the capstan or the like.

[Drum Integrated Type CTL Head Mechanism]

Figure 8:
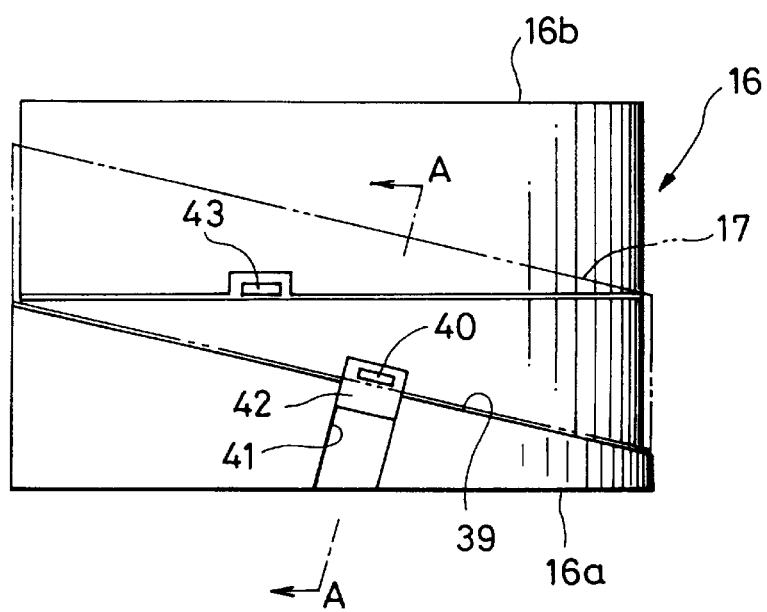
FIG. 8 is an allocation diagram of a CTL head on the rotating head drum.
Figure 9:
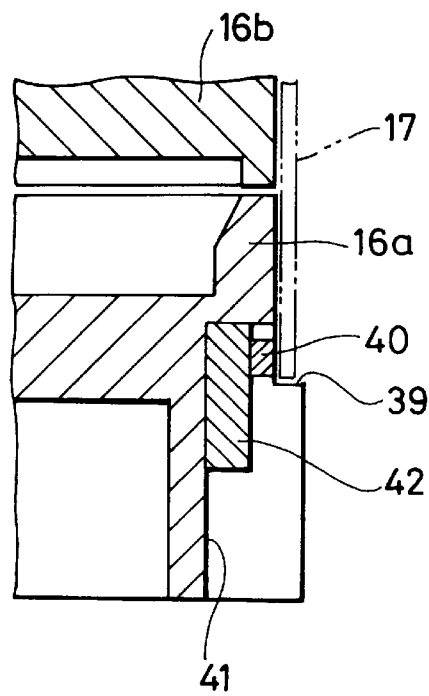
FIG. 9 is an enlarged sectional view taken along the line A—A in FIG. 8.

As shown in FIGS. 8 and 9, a CTL head 40 is disposed so as to be embedded in the vicinity of a lead 39 formed on a fixed side drum 16a of the rotating head drum 16. That is, a concave portion 41 is formed on the fixed side drum 16a such that it traverses the lead 39 and the CTL head 40 is supported in this concave portion 41 through a mounting plate 42. Consequently, the CTL track of the magnetic tape 17 running along the lead 39 corresponds to the CTL head 40 so that the CTL signal can be read. Reference numeral 43 designates a video head disposed in a rotating side drum 16b of the rotating head drum 16.

With such a construction, it is possible to save a space unlike a conventional method in which the CTL head 40 is mounted on a tape running path.

[Detection of Tape Top/End]

Figure 10:
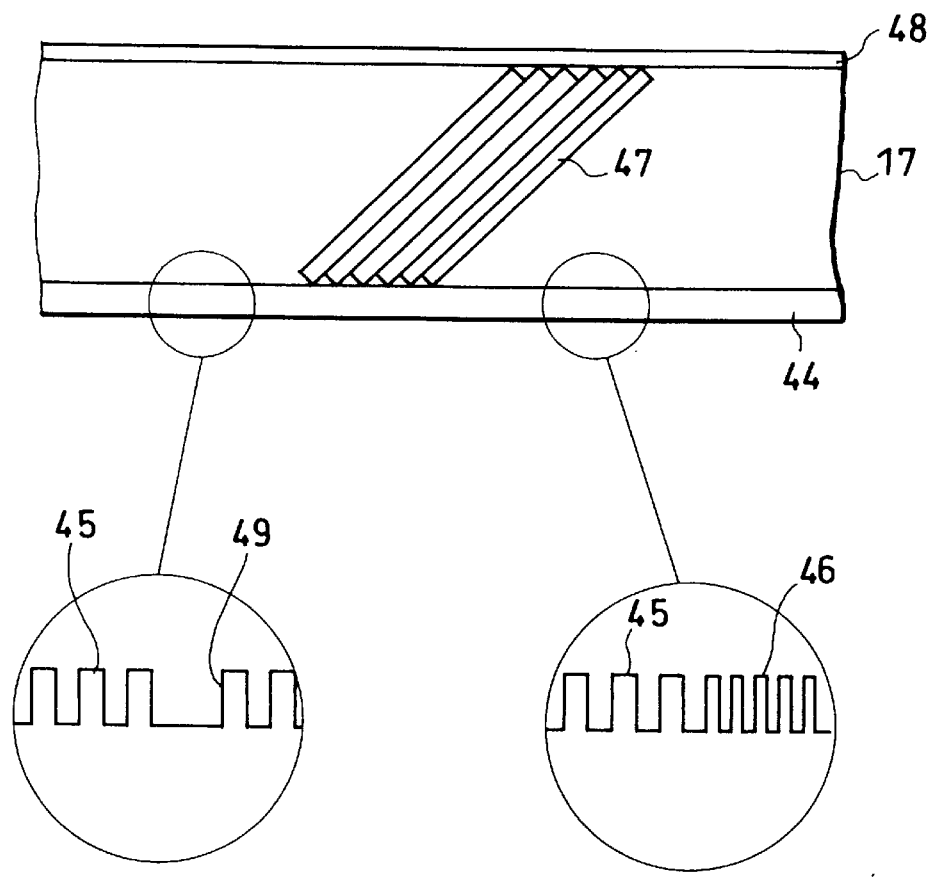
FIG. 10 is an explanatory view of a tape top/end detecting signal, a tape servo signal and a phase servo signal using a CTL signal.

As shown in FIG. 10, with respect to a tape servo signal 45 prerecorded on a CTL track 44 of the magnetic tape 17, a top/end detecting signals 46 having a different frequency is prerecorded in a tape top portion and a tape end portion. When the tape top/end detecting signal 46 is read by the CTL head, detection of the top/end is carried out. Meanwhile, reference numeral 47 designates a recording/ reproduction track and numeral 48 designates a cue track.

[Tape Servo/Phase Servo Detection]

As shown in FIG. 10, a portion in which one wave of the signal is missing is provided with respect to the tape servo signal 45 prerecorded on the CTL track 44 of the magnetic tape 17 and a leading of the signal next to that portion where one wave is missing is specified as a reference signal 49. Consequently, the tape servo signal and the phase servo signal can be detected by means of the CTL head.

[Tape Back Tension Mechanism]

As shown in FIG. 4, fixed brakes 50, 51 are respectively made to contact the reel base 12 on the tape supply side and the reel base 13 on the tape winding side with a predetermined frictional force. Thus, during the tape running, the reel bases 12, 13 are rotated in a slightly braked condition. Consequently, the tape is in such a state in which back tension is applied to the tape, so as to prevent the tape from being loose.

[Tape End Detecting Mechanism Using Rotating Head Drum]

Figure 11:
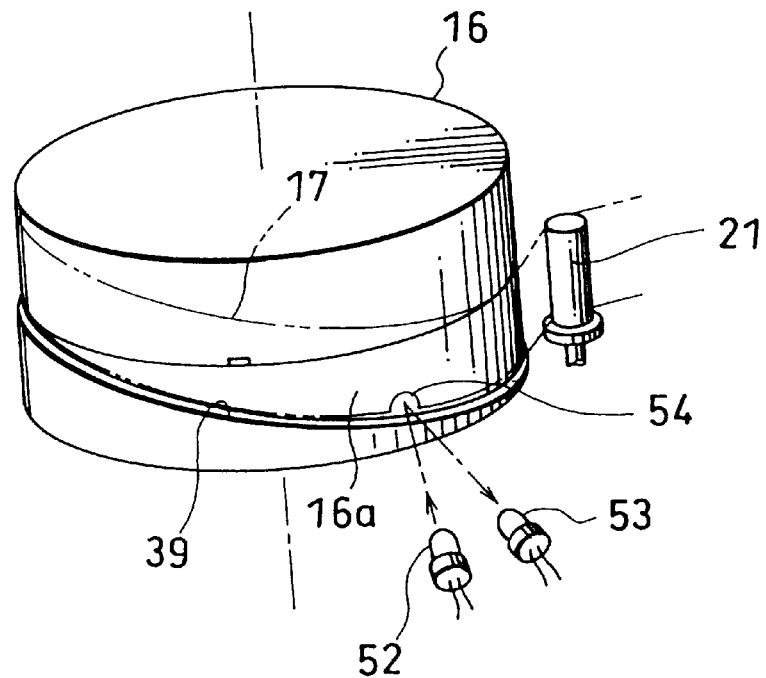
FIG. 11 is an explanatory view of tape end detection by using the rotating head drum.

As shown in FIG. 11, so as to oppose the portion of the fixed drum 16a just above the lead 39 in the rotating head drum 16, a light emission element 52 made of a photo sensor or the like and a light receiving element 53 for receiving the light reflected on the surface of the fixed drum 16a of the light emitted from the light emission element 52 are disposed. On a tape edge at a tape end portion of the magnetic tape 17, one or a plurality of apertures or an opening portion 54 as shown in the embodiment are formed.

With such a construction, in recording and reproduction actions of the magnetic tape 17, the light from the light emission element 52 is absorbed by the magnetic tape surface and hence it is not incident on the light receiving element 53. If the tape end comes close and the opening portion 54 passes the photo sensor, the light from the light emission element 52 is reflected on the fixed drum surface through the opening portion 54 and then the reflected light is incident on the light receiving element 53 so as to enable detecting that it is a tape end.

[Detecting Mechanism for Tape Running Height Relative to Rotating Head Drum]

Figure 12:
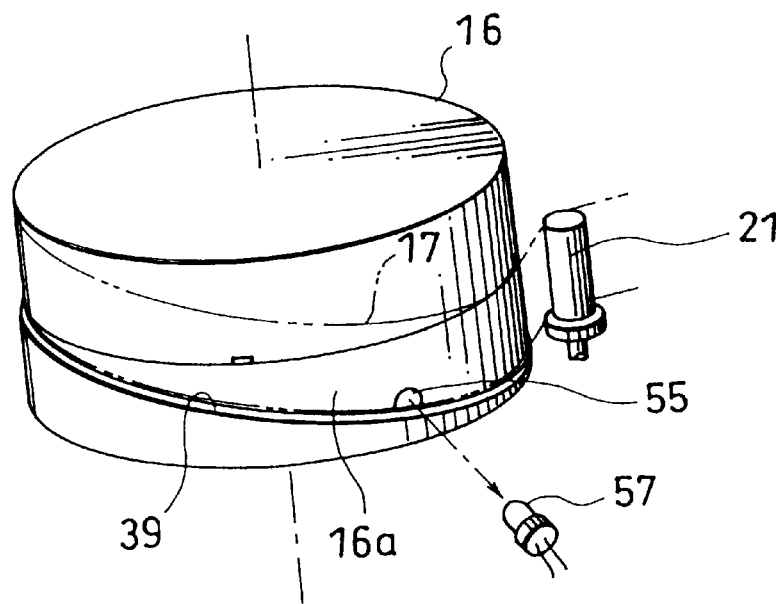
FIG. 12 is an explanatory view of tape pass detection relative to the rotating head drum.
Figure 13:
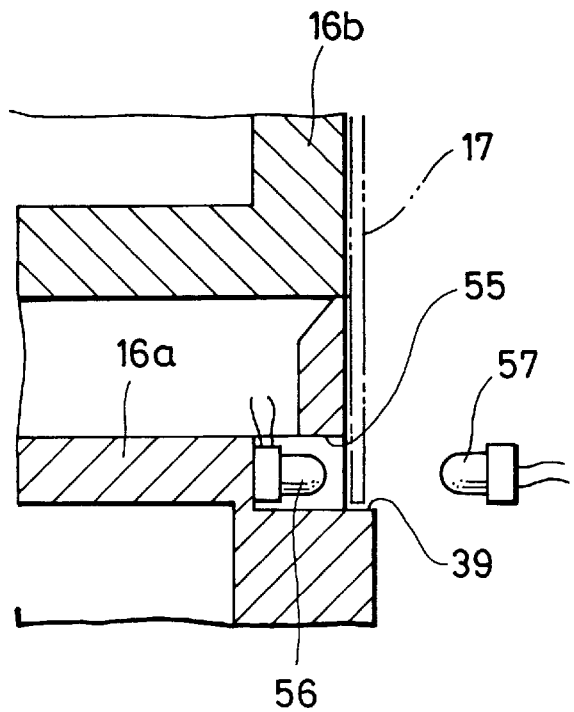
FIG. 13 is an enlarged sectional view of FIG. 12.

As shown in FIGS. 12 and 13, an opening hole 55 is formed on the portion of the fixed drum 16a just above the lead 39 on the rotating head drum 16. Within this opening hole 55 there is housed a light emission element 56 such as an LED or the like and a light receiving element 57 such as a photo sensor or the like is disposed outside the drum so as to oppose the light emission element 56.

With this construction, it is possible to detect whether or not a lower edge of the magnetic tape 17 which runs while wound around the rotating head drum 16 in a helical form is positioned accurately along the lead 39 of the drum. That is, in such a state in which the magnetic tape 17 is running with its lower edge positioned accurately along the lead 39, the light emitted from the light emission element 56 is completely intercepted by the magnetic tape 17 so that it is not incident on the light receiving element 57. If the lower edge of the magnetic tape 17 is floated up from the lead 39 when it runs, the light from the light emission element 56 leaks outside and is incident on the light receiving element 57. Consequently, it is detected that the magnetic tape is not wound at an accurate position relative to the rotating head drum.

[Tape Fall Preventing Lead Mechanism]

Figure 14:
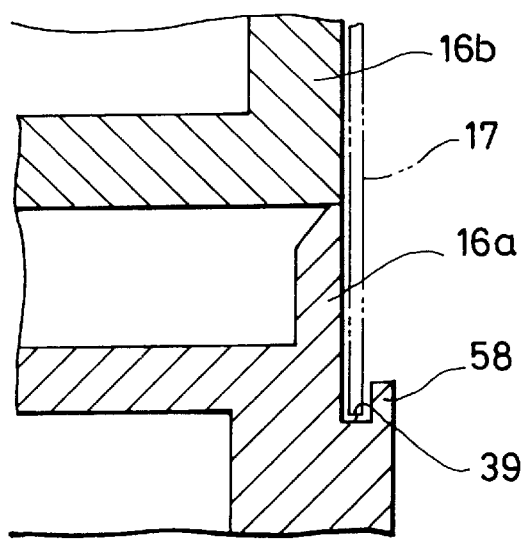
FIG. 14 is a sectional view of a major part of the rotating head drum in which a tape fall preventing flange is formed.

By molding a tape fall preventing flange 58 integrally with an outer peripheral portion of the lead 39 of the fixed drum 16a as shown in FIG. 14, it is possible to prevent the magnetic tape 17 from slipping out of the lead 39 with a simple structure.

[Drum Base Integrated Type Lead]

Figure 15:
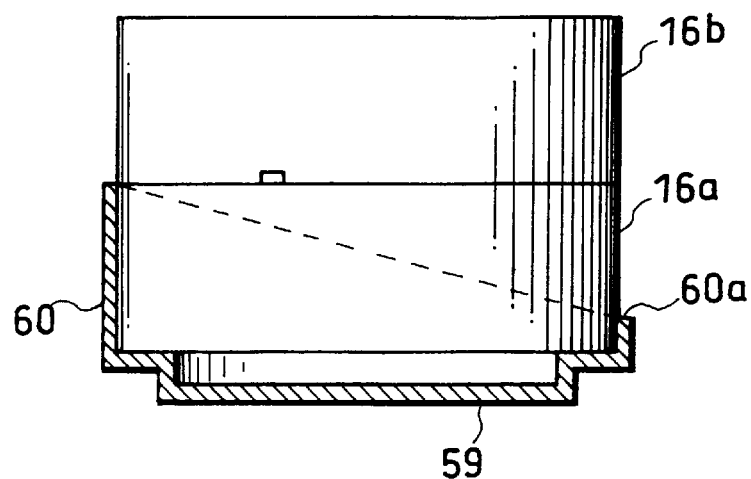
FIG. 15 is a sectional view of a drum base integrated type lead.
Figure 16:
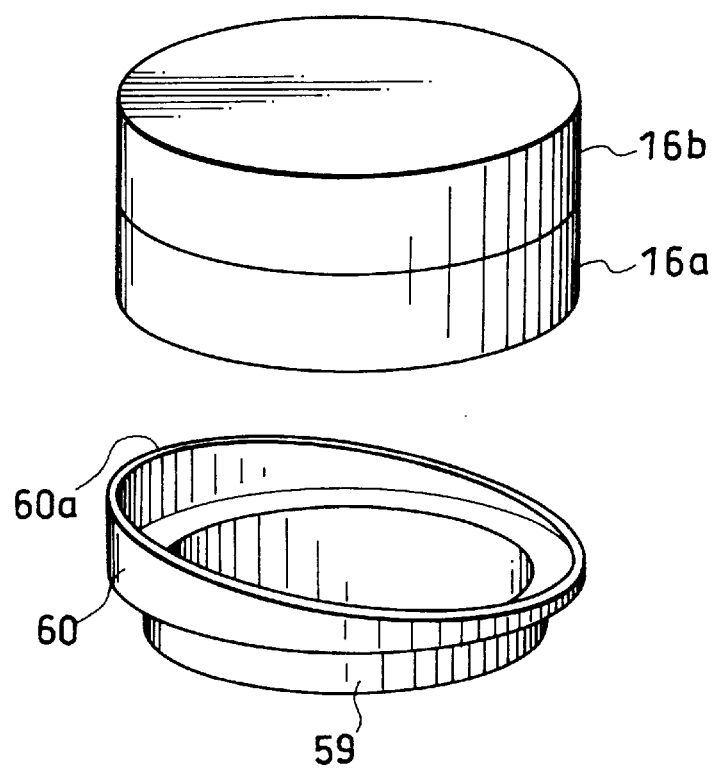
FIG. 16 is a perspective view of a state in which the drum and the lead in FIG. 15 are separated.

Generally, the positioning lead for winding the magnetic tape around the rotating head drum was worked on a circumference of the fixed drum with a lathe or the like. According to the present invention, as shown in FIGS. 15 and 16, a lead unit 60 is formed integrally with a drum base 59 and the lead unit 60 is engaged with an outside circumference of the fixed drum 16a by pressure fitting or the like.

With such a construction, the lead unit 60 can be molded of a plastic material and further a shape of its lead surface 60a can be molded easily.

[1-Base Video Head Mechanism]

Figure 17:
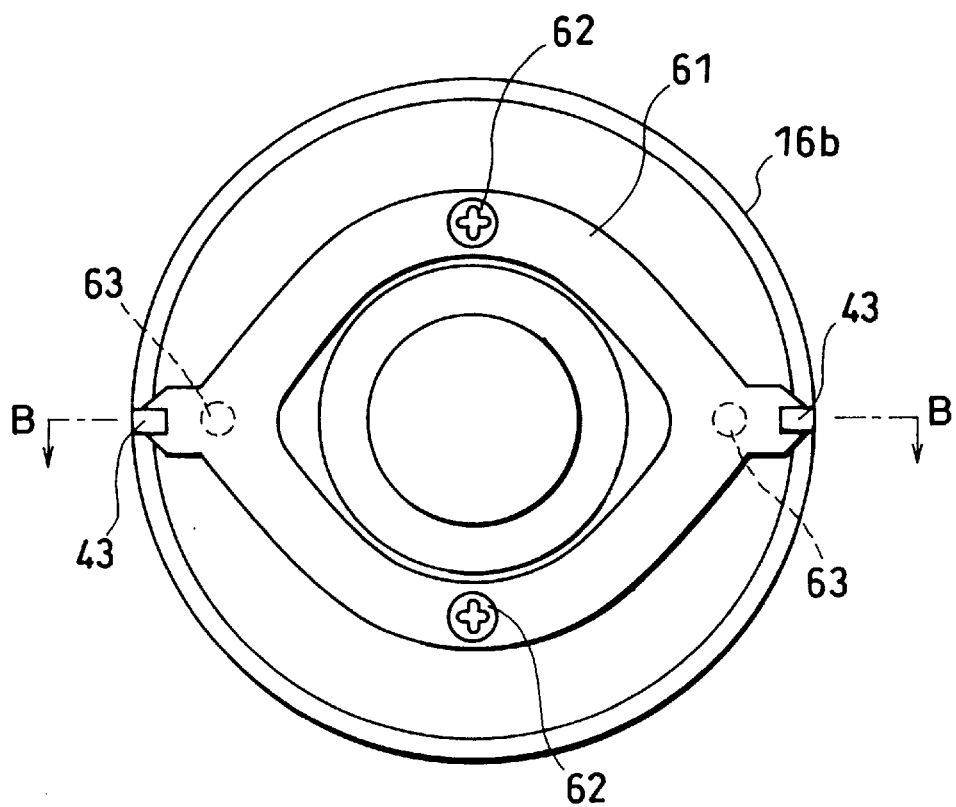
FIG. 17 is a plan view of a video head height adjusting mechanism viewed from the rear side of the rotating side drum.
Figure 18:
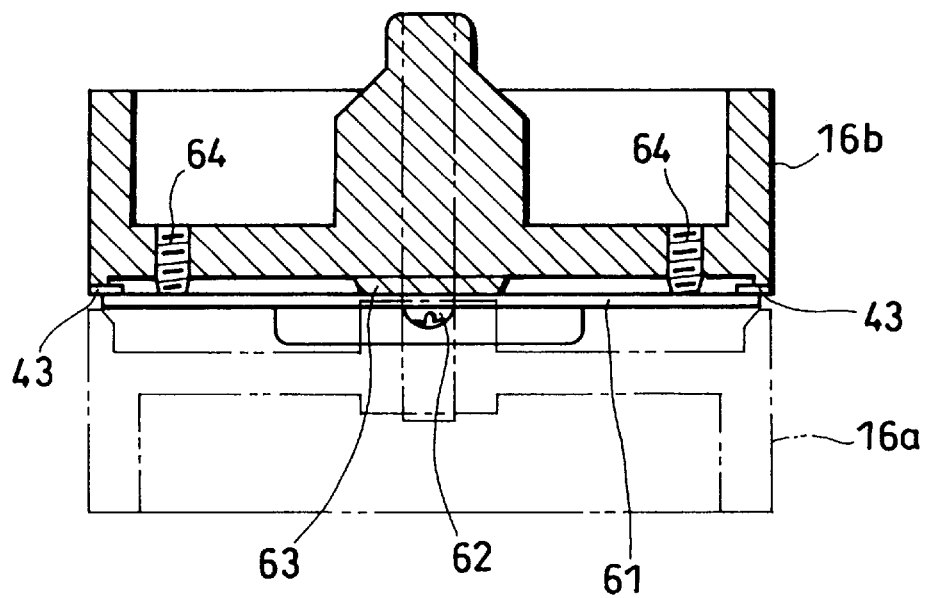
FIG. 18 is a sectional view taken along a line B-B in FIG. 17.

FIG. 17 is a plan view of the rotating drum 16b viewed from its rear side and FIG. 18 is a sectional view taken along a line B—B in FIG. 17. On the rear surface of the rotating drum 16b, a single base plate 61 is fixed at a drum center to base receiving portions 63, 63 with screws 62, 62 and two video heads 43, 43 are mounted to both ends of the base plate 61. Tip ends of adjusting screws 64, 64 screwed into the drum are in contact with the base plate 61 and turning the adjusting screws 64 can adjust tracking of the video heads 43, 43 through the base plate 61.

Figure 19:
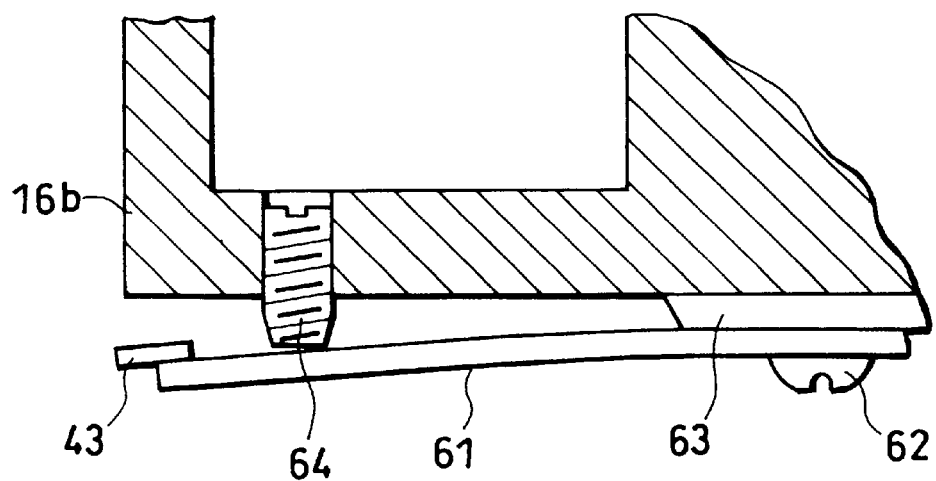
FIG. 19 is an enlarged sectional view of the video head height adjusting mechanism.
Figure 20:
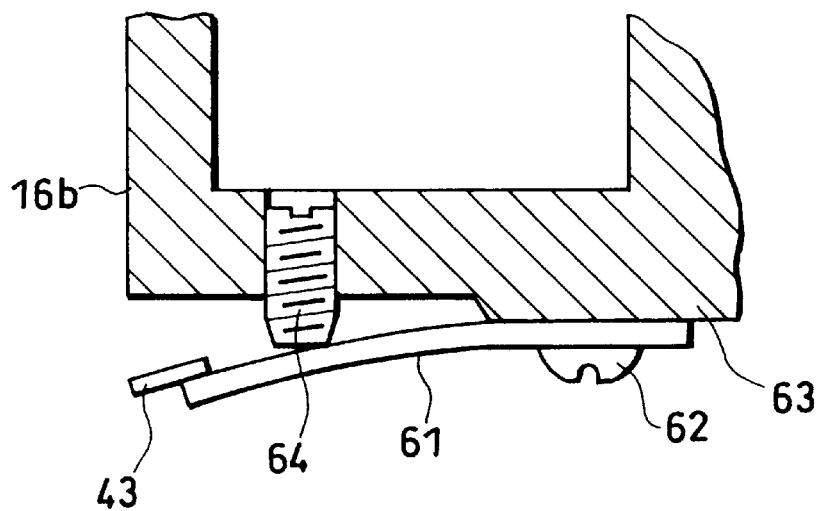
FIG. 20 is an enlarged sectional view of a conventional video head height adjusting mechanism.

FIG. 19 is an enlarged sectional view of the tracking adjusting portion on one of the video heads 43 side and FIG. 20 is an enlarged sectional view of a conventional tracking adjusting portion.

Referring to FIG. 19, since a long span can be secured from the screw fixing portion of the base plate 61 to the tip end of the video head 43, thus an inclination of the video head 43 when the height of the video head 43 is adjusted with the adjusting screw 64 can be suppressed to a small value so that its contact to the magnetic tape is not affected. Thus, the receiving portion 63 for the base plate 61 does not have to be finished at a high precision and an accuracy in the video head installation height can be determined roughly.

On the contrary, in the conventional case shown in FIG. 20, because a span from the screw fixing portion of the base plate 61 to the video head tip end portion is short, an inclination when the video head 43 is adjusted with the adjusting screw 64 is increased so that its contact to the magnetic tape is reduced. Thus, the accuracy of the receiving portion 63 for the base plate 61 and the accuracy of the video head height need to be made high.

[Reel Base/Tape Reel Integral Type Mechanism]

Because the tape reels 14, 15 do not have to be detachable relative to the reel bases 12, 13, they can be formed integrally, so that the structure thereof is simple and production cost thereof is low to that extent. By adjusting the height of the reel bases 12, 13 by rotating center shafts 14a, 15a of the tape reels 14, 15, the height of the tape can be adjusted.

[Tape Guide Mechanism Without Upper Flange]

If a downward pressure is applied by the tape guide to a tape in a tape running system in which a tape is extracted from the tape supply side tape reel 14 and wound around the tape winding side tape reel 15, a tape guide without an upper flange can be formed.

Although in the embodiments above, a case in which the reel motor 23 and the drum motor are contained in the cartridge 10 has been described, these motors may be arranged on the video camera body 1 side.

Although a case in which a detachable cartridge having the electronic apparatuses and the recording/reproduction mechanism is applied to the video camera has been described, this can be applied widely to audio apparatus and the like.

Further, the recording/reproduction mechanism unit in the cartridge can be applied to a cartridge containing therein a disk and a photoelectromagnetic mechanism unit except for the magnetic tape and the rotating head drum.

The electronic apparatus of the present invention described above is an electronic apparatus in which a cartridge having a recording/reproduction mechanism unit can be removed and installed, and comprises an accommodating portion in which the cartridge is accommodated, a connector in the accommodating portion for electrically connecting an I/O terminal provided in the cartridge thereto and a circuit portion for the recording/reproduction mechanism unit. Thus, a purpose of this apparatus can be attained by only the circuit portion for driving and controlling the recording/reproduction mechanism unit of the cartridge as an electronic apparatus and the cartridge insertion mechanism and tape loading mechanism become unnecessary. Thus, large scale simplification of the mechanism and compact structure of the apparatus can be attained so that a novel electronic apparatus can be provided.

Further, because the electronic apparatus is provided with the camera mechanism, it is possible to present a function of the video built-in type camera.

Further, the cartridge of the present invention is a cartridge which can be loaded and unloaded in an electronic apparatus. The cartridge case has therein the recording/reproduction mechanism unit including a pair of the reel bases, tape reels supported by the reel bases respectively, and the rotating head drum around which the magnetic tape is wound for performing recording and reproduction action. The cartridge case is provided with an I/O terminal to be electrically connected to the electronic apparatus. Because the magnetic tape extracted from the tape reel is wound around the rotating head drum, and under this state they are integral with dimensional accuracy of the rotating head drum itself and an accuracy standard for the inclination of the lead relative to the magnetic head or the like can be lightened so that a very simple recording/reproduction mechanism unit can be obtained. Further, adjustment at the time of assembly can be simplified and low cost and compact structure can be attained.

Further, because the reel motor for driving the reel base is contained in the cartridge case and integration of the reel base and the tape reel can be attained, assembling property, assembly, maintenance and inspection thereof can be made easily.

Because the drum motor is integrally provided in the rotating head drum, the space in which the drum motor is installed can be effectively used.

Because the recording/reproduction mechanism unit is sealed in the cartridge case, it is possible to prevent corrosion from being generated in the recording/reproduction mechanism unit and particularly to prevent a formation of dew on the surface of the rotating head drum.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An electronic apparatus in which a cartridge having a recording/reproduction mechanism unit can be loaded and unloaded, comprising:

an accommodating portion for accommodating said cartridge inserted in said accommodating portion along an insertion plane;

a connector in said accommodating portion for electrically connecting an I/O terminal provided in said cartridge and positioned so as to electrically connect said I/O terminal in the insertion plane of said cartridge;

a circuit portion for said recording/reproduction mechanism unit; and wherein said accommodating, portion, said connector and said circuit portion are contained in a camera mechanism unit.

2. A cartridge for loading and unloading into a camera mechanism unit along an insertion plane, said camera insertion unit having an accommodating portion for accommodating said cartridge inserted along said insertion plane, a connector in said accommodating portion for electrically connecting to an I/O terminal in said cartridge, and a circuit portion, said cartridge comprising:

a cartridge case having therein a recording/reproduction mechanism unit including a pair of reel bases, tape reels supported by said reel bases, respectively, a rotating head drum around which a magnetic tape is wound for achieving recording and reproduction, and an I/O terminal to be electrically connected to said connector in said camera mechanism unit in the insertion plane of said cartridge, said rotating head drum being positioned so that a magnetic tape withdrawn from said tape reels is wound therearound so as to be integral with said rotating head drum.

3. A cartridge according to claim 2, wherein a reel motor driving said reel bases is built in said cartridge case.

4. A cartridge according to claim 2, wherein said rotating head drum is constructed integrally with a drum motor.

5. A cartridge according to claim 2, wherein said recording/reproduction mechanism unit is sealed in said cartridge case.

* * * * *